No. 772,198. PATENTED OCT. 11, 1904.
J. A. WILLIAMS.
VEHICLE.
APPLICATION FILED JUNE 16, 1904.
NO MODEL. 3 SHEETS—SHEET 1.
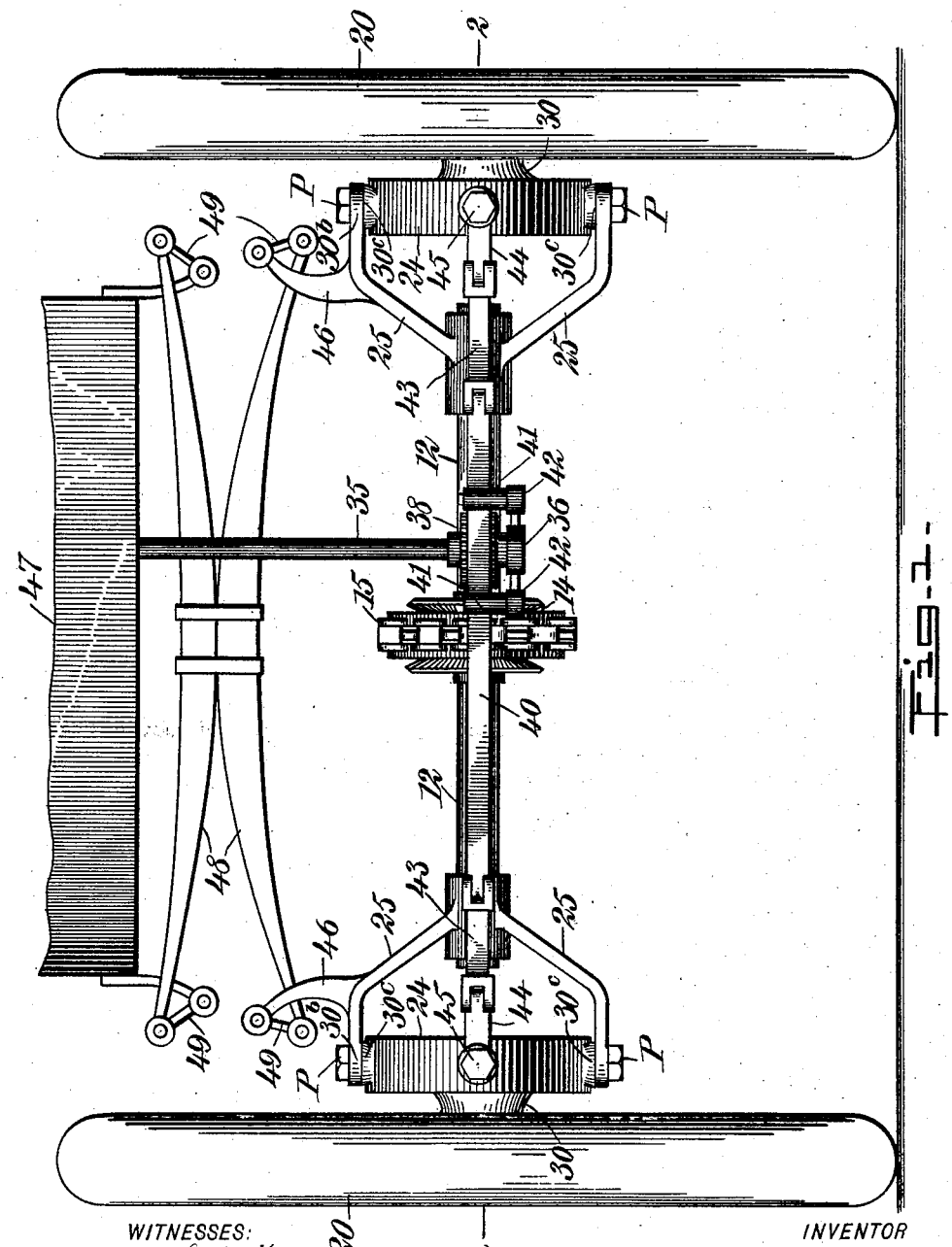
WITNESSES:
INVENTOR
Joseph A. Williams
BY
ATTORNEYS

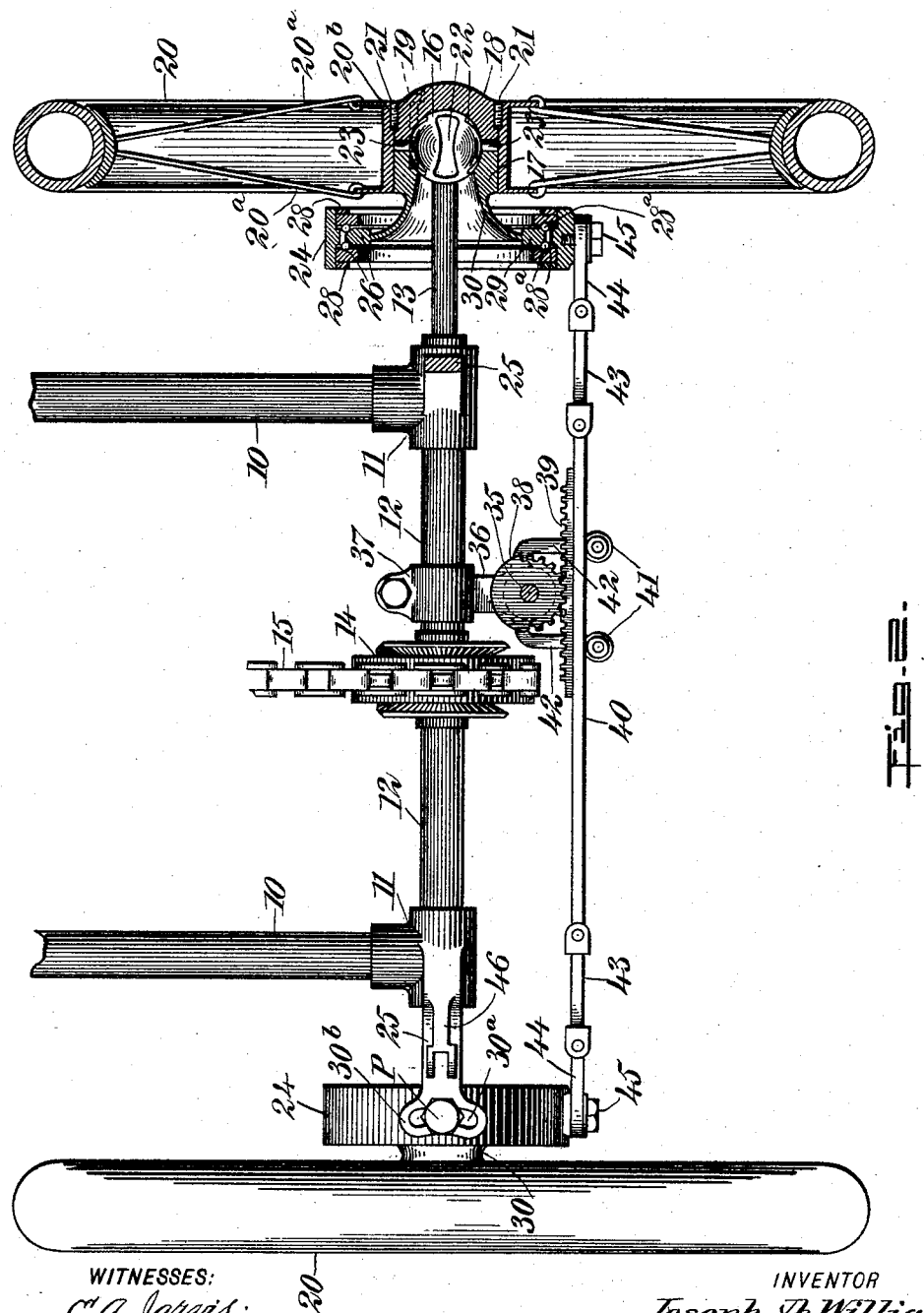

No. 772,198. PATENTED OCT. 11, 1904.
J. A. WILLIAMS.
VEHICLE.
APPLICATION FILED JUNE 16, 1904.
NO MODEL. 3 SHEETS—SHEET 3.
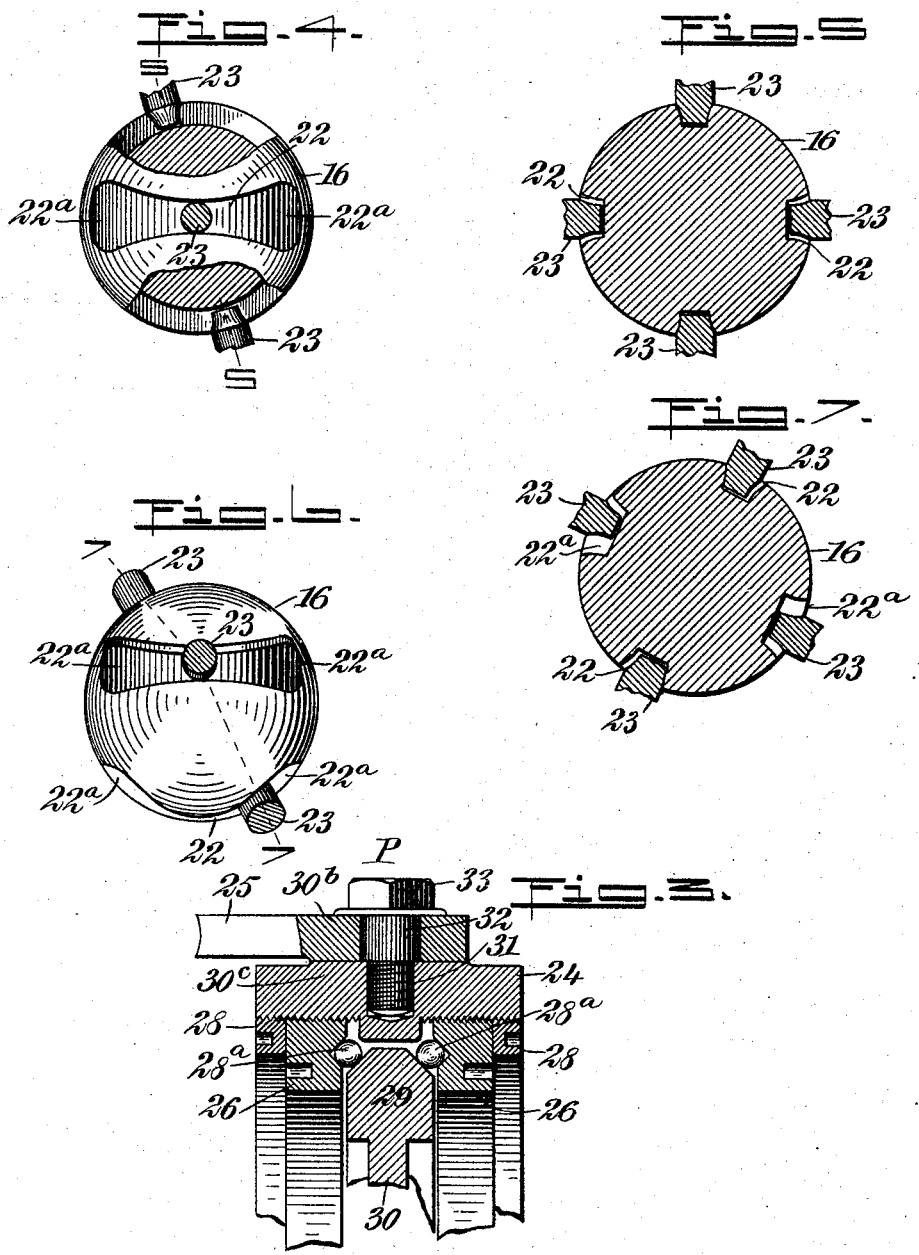
WITNESSES:
INVENTOR
Joseph A. Williams
BY
ATTORNEYS No. 772,198. Patented October 11, 1904.

UNITED STATES PATENT OFFICE.

JOSEPH A. WILLIAMS, OF CLEVELAND, OHIO.

VEHICLE.

SPECIFICATION forming part of Letters Patent No. 772,198, dated October 11, 1904.

Application filed June 16, 1904. Serial No. 212,796. (No model.)

*To all whom it may concern:*

Be it known that I, JOSEPH A. WILLIAMS, a citizen of the United States, and a resident of Cleveland, in the county of Cuyahoga and State of Ohio, have invented a new and Improved Vehicle, of which the following is a full, clear, and exact description.

My invention relates to vehicles, and more particularly to the axle of those of the motor-driven type.

Its principal objects are to provide a simple and durable arrangement whereby the driving power may be applied to the axle of the steering-wheels.

With such ends in view my invention consists in the various features and combinations hereinafter described, and more particularly claimed.

Reference is to be had to the accompanying drawings, forming a part of this specification, in which similar characters of reference indicate corresponding parts in all the figures.

Figure 1 is an end elevation of a portion of a vehicle embodying one form of my invention. Fig. 2 is a partial horizontal section therethrough on the line 2 2 of Fig. 1. Fig. 3 is a broken vertical sectional detail through the connection between the casing and one of the supporting-arms. Fig. 4 shows the relation between the ball upon the end of the axle and the coacting pins in the hub for one position of the elements. Fig. 5 is a section therethrough on the line 5 5 of Fig. 4, and Figs. 6 and 7 are similar views with the ball and pins in another position.

The numerals 10 10 designate longitudinal stays of a vehicle-frame, each of which carries upon its forward end a head or T-casting 11, in which is secured a sleeve 12. These two sleeves are in alinement, and in each of them is journaled a shaft or axle 13, having at their adjacent ends elements of a differential gearing 14 of any convenient type, here shown as driven by a chain 15, extending from the motor or source of power. At the outer end of each axle is a spherical connecting member or ball 16, which coacts with a socket formed in a hub comprising an inner section 17 and an outer section 18, separably connected by longitudinal screws 19. Upon each hub is mounted a wheel 20, the spokes $20^a$ of which radiate from a sleeve $20^b$, which may be keyed to the hub by screws 21, threaded into the openings comprised in both members.

To compel the rotation of the wheels with the axles, each ball is provided with a series of grooves 22, the longitudinal axes of which are in alinement with the axle. Into these grooves extend pins or projections 23, fixed to the hub and allowing the wheel to rock or swing upon the axle, while constraining it to rotate therewith. To permit this rocking to occur in a horizontal plane to enable the vehicle to be steered while preventing the wheels from wabbling or displacement in a vertical plane, a guide member is provided for each wheel, here shown as an annular casing 24, carried by opposite arms 25, extending from the T member 11, at the outer end of the sleeve. In each casing is an annular groove, preferably formed between opposite ball-races 26 26, threaded into the casing and retained in place by threaded collars 28. These races guide suitable balls or similar antifriction members $28^a$, which contact with opposite sides of an enlargement 29, extending about the periphery of an annular flange or projection 30, here shown as formed integrally with the hub and flaring therefrom. The mounting of the casing upon the arms is preferably provided through slots $30^a$, extending through elongated portions $30^b$ at the outer ends of the arms, which contact with flattened areas $30^c$ at the opposite sides of the casing, these slots having the form of arcs of circles struck from the vertical axis of the ball 16. With each of these slots coöperates a pin or projection P, having a threaded end 31, engaging a threaded opening in the casing, a cylindrical portion 32 lying within the slot and a head 33 situated outside the arm. It will be seen that this mounting resists the lateral movement of the wheel in a vertical plane or about a horizontal axis while permitting it to swing horizontally or about a vertical axis to exercise the steering function.

From a consideration of Figs. 4 to 7 of the drawings it will be seen that if the grooves 22 were of the same width throughout they would permit the steering movement of the wheel when one pair of engaging pins were in a vertical plane, thus causing the companion pair to move horizontally, as is indicated in Figs. 4 and 5, but that if the axle were turned to another angle, as is shown in Figs. 6 and 7, the steering movement would be wholly against the rotative force of the motor. To obviate this difficulty, each groove is widened at its opposite ends 22$^a$ to give a clearance, the contour of the walls being preferably of reversed ellipsoidal form.

The steering may be effected by means of a spindle 35, which has a bearing in a bracket 36, projecting from a clip 37, surrounding one of the axle-sleeves. Upon this spindle is fixed a partial pinion 38, which meshes with a rack 39, carried by a bar 40. This bar is shown as guided by rolls 41, mounted upon arms 42, which project from the bracket. To the opposite ends of the bar are articulated links 43, which connect the steering-bar with arms 44, fixed to the casings by screws 45. Projecting from each of the upper casing-arms is a bracket 46, to which and to the body 47 of the vehicle supporting-springs 48 are connected by links 49.

In operation the axles are rotated through the differential gearing and drive the wheels by the contact of the hub projections with the grooves in the balls upon the axles. The hub-flanges by their coöperation with the grooves in the casings and the support of these casings upon the slotted arms allow the wheels to be turned to direct the course of the vehicle by swinging said casings through the movement of the steering-bar, at the same time maintaining them in their true vertical relation. Thus by my improved organization the vehicle may be driven by the application of power to its supporting-axle without interfering with the flexibility of movement or sensibly weakening the structure. Moreover, the manner in which the relatively movable surfaces are inclosed tends to exclude dust and prevents undue wear.

Having thus described my invention, I claim as new and desire to secure by Letters Patent—

1. The combination with a frame, of an axle rotatable therein, wheels movable upon the axle but constrained to rotate therewith, an annular guide member pivoted about a fixed point upon the frame, and an annular projection from the wheel coacting with the guide member.

2. The combination with a frame, of an axle rotatable therein, wheels movable upon the axle but constrained to rotate therewith, an annular guide member pivoted about a fixed point upon the frame and provided with a groove, and an annular projection from the wheel operating in the groove.

3. The combination with a frame, of an axle rotatable therein, wheels movable upon the axle but constrained to rotate therewith, an annular guide member pivoted about a fixed point upon the frame, an annular projection from the wheel coacting with the guide member, and steering mechanism attached to the guide member.

4. The combination with a frame, of an axle rotatable therein, an arm fixed to the frame, a casing swinging upon the arm, a wheel having rotatable engagement with the axle and being mounted to swing thereon, and a projection from the wheel engaging the casing.

5. The combination with a frame, of an axle rotatable therein, an arm fixed to the frame, a casing swinging upon the arm and being provided with an annular groove, a wheel having rotatable engagement with the axle and being mounted to swing thereon, and an annular flange extending from the wheel into the casing-groove.

6. The combination with a frame, of an axle rotatable therein, an arm fixed to the frame, a casing mounted upon the arm, said casing and arm having a coacting projection and slot, a wheel having rotatable engagement with the axle and being mounted to swing thereon, and a projection from the axle engaging the casing.

7. The combination with a frame, of an axle rotatable therein, an arm fixed to the frame and provided with a curved slot, a casing having a projection engaging the slot, a wheel having rotatable engagement with the axle and being mounted to swing thereon, and a projection from the axle engaging the casing.

8. The combination with a frame, of an axle rotatable therein, a ball carried at the end of the axle and being provided with grooves increasing in width at their ends, and a wheel having a socket to receive the ball and projections engaging the grooves.

9. The combination with a frame, of an axle rotatable therein, a ball carried at the end of the axle and being provided with grooves, a wheel having a socket to receive the ball and projections engaging the grooves, a casing carried by the frame and being provided with an annular groove, and an annular flange extending from the hub of the wheel into the casing-groove.

10. The combination with a frame, of an axle rotatable therein, a ball carried at the end of the axle and being provided with grooves, a wheel having a socket to receive the ball and projections engaging the grooves, an arm fixed to the frame and having a slot curved in an arc struck from a vertical axis through the ball, a casing provided with a projection coöperating with the slot, and a projection from the wheel engaging the casing.

11. The combination with a frame, of an axle rotatable therein, a ball carried at the end of the axle and being provided with grooves, a wheel having a socket to receive the ball and projections engaging the grooves, a casing carried by the frame and being provided with an annular groove, an annular flange extending from the hub of the wheel into the casing-groove, and steering mechanism attached to the casing.

12. The combination with a frame comprising separated sleeves, of axles journaled in the sleeves, gearing connected with the axles between the sleeves, a ball carried at the outer end of each axle and being provided with grooves, a wheel having a socket to receive the ball and projections engaging the grooves, and means movable upon the frame and coacting with the wheels for maintaining said wheels in a vertical position.

13. The combination with a frame comprising separated sleeves, of axles journaled in the sleeves, gearing connected with the axles between the sleeves, a ball carried at the outer end of each axle and being provided with grooves, a wheel having a socket to receive the ball and projections engaging the grooves, guide members movable upon the frame, projections from the wheels engaging the guide members, and steering mechanism connected with the guide members.

14. The combination with a frame comprising separated sleeves, of axles journaled in the sleeves, gearing connected with the axles between the sleeves, a ball carried at the outer end of each axle and being provided with grooves, a wheel having a socket to receive the ball and projections engaging the grooves, guide members movable upon the frame, projections from the wheels engaging the guide members, and steering mechanism supported upon one of the sleeves and connected with the guide members.

15. The combination with a frame comprising separated sleeves, of axles journaled in the sleeves, gearing connected with the axles between the sleeves, a ball carried at the outer end of each axle and being provided with grooves, a wheel having a socket to receive the ball and projections engaging the grooves, arms carried by the sleeves, guide members movable upon the arms, projections from the wheels engaging the guide members, springs mounted upon the arms, and a body carried by the springs.

In testimony whereof I have signed my name to this specification in the presence of two subscribing witnesses.

JOSEPH A. WILLIAMS.

Witnesses:
EMILY LONG,
JNO. M. RITTER.